A. C. LATTA.
DRAFT-EQUALIZER.

No. 176,323. Patented April 18, 1876.

UNITED STATES PATENT OFFICE.

ADRIAN C. LATTA, OF FRIENDSHIP, ASSIGNOR OF ONE-HALF HIS RIGHT TO EMMET G. LATTA, OF SAME PLACE, AND PRATT & LETCHWORTH, OF BUFFALO, NEW YORK.

IMPROVEMENT IN DRAFT-EQUALIZERS.

Specification forming part of Letters Patent No. 176,323, dated April 18, 1876; application filed January 3, 1876.

*To all whom it may concern:*

Be it known that I, ADRIAN C. LATTA, of Friendship, in the county of Allegany and State of New York, have invented certain Improvements in Whiffletrees, which improvements are fully set forth in the following specification, reference being had to the accompanying drawing.

My invention relates to that class of double whiffletrees which are pivoted to the tongue at a short distance in the rear of the whiffletree, so that when the latter is swung on its pivot out of its normal position the leverage on which the two horses pull is made unequal, the leading horse drawing on the shorter lever, while the horse in the rear works on the longer lever, thereby enabling the rear horse to readily gain on the horse having the start, and return to its proper position.

My invention consists of the peculiar construction of the devices employed for connecting the whiffletree to the tongue, as will be hereinafter fully set forth.

Figure 1:
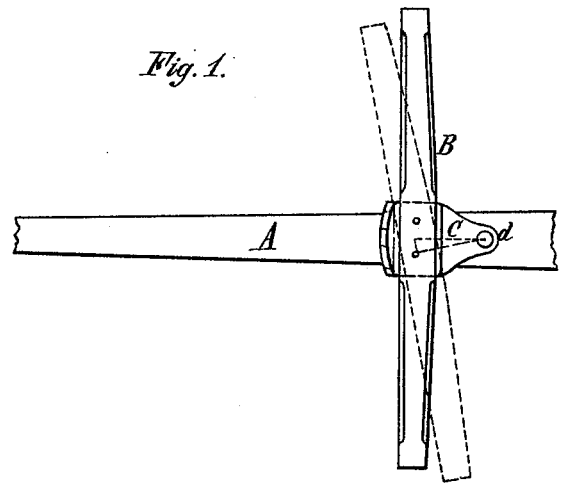
Figure 2:
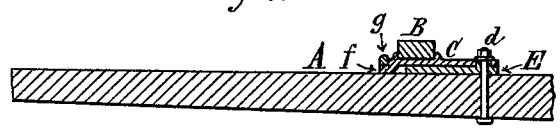
Figure 3:
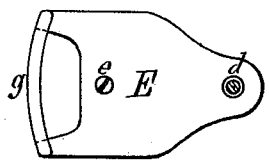
Figure 4:
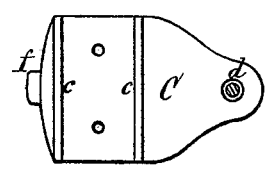
Figure 5:
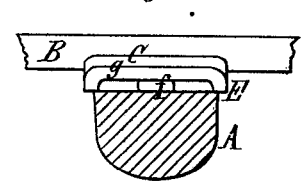
Figure 6:
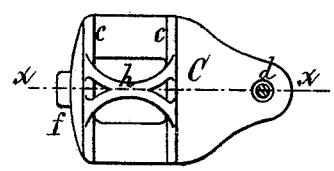
Figure 7:
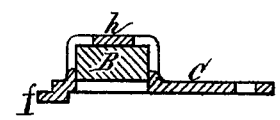

In the accompanying drawing, Figure 1 is a plan view of a double whiffletree and vehicle-tongue, provided with my improvements. Fig. 2 is a longitudinal section thereof. Fig. 3 is a plan view of the wear-plate attached to the tongue. Fig. 4 is a plan view of the arm or plate to which the double whiffletree is secured in a slightly modified form. Fig. 5 is a front view of the two plates with the tongue in section. Fig. 6 represents a plan view of the arm or plate to which the double whiffletree is secured. Fig. 7 is a longitudinal section thereof in line *x x*, Fig. 6.

Like letters of reference refer to like parts in each of the figures.

A represents the tongue of the vehicle, and B the double whiffletree. C is a plate or arm, secured to the under side of the whiffletree B at its center and extending backward a short distance, where it is connected to the tongue A by a pivot, *d*, the whiffletree swinging on the latter by means of the arm or plate C. E represents a wear-plate, corresponding in form with the plate C, and arranged on the upper side of the tongue A under the plate C, and secured to the tongue at the rear by the pivot *d*, and at the front by a screw or bolt, *e*. The plate C is provided at its front with a projecting finger, *f*, engaging under a raised curved guide, *g*, formed at the front of the wear-plate E, whereby the latter and the arm C are retained in close contact, preventing any rattling and tilting of the whiffletrees and relieving the pivot *d* of any lateral strains, while the sweep of the whiffletree is at the same time limited by the finger *f* striking against the ends of the guide at either extreme of its movement. The plate C is provided on its upper side with a raised bow or loop, *h*, in which the whiffletree is inserted, as clearly shown in Figs. 6 and 7. The whiffletree is securely clamped in the bow *h* by depressing the latter slightly into the wood, thereby doing away with the fastening-bolts and avoiding the weakening of the whiffletree by bolt-holes. The plate E is preferably cut away under the loop *h*, so as to enable the plate to be cast with the bow without coring. If desired, however, the raised bow *h* may be dispensed with and the whiffletree secured to the plate C by two bolts, as represented in Figs. 1 and 4. The finger *f*, engaging under the guide *g* of the wear-plate E, by resting against the end of the guide at each extreme of its movement, relieves the pivot *d* of a great amount of the strain, and by limiting the sweep of the whiffletree prevents either horse from getting too far in the rear, while it assists in turning the vehicle by holding back the inner horse and enabling the outer horse to draw the tongue around by the whiffletree, instead of pushing it around by the neck-yoke, which latter mode is very objectionable in heavy teaming. The two plates C and E form a firm bearing or support for the whiffletree in its movements, and retain it in a horizontal position on the tongue. They are readily and cheaply constructed of malleable or ordinary cast iron, the latter being preferably used for heavy whiffletrees and malleable iron for light whiffletrees.

I am aware that double whiffletrees have been pivoted by means of wrought-iron straps and otherwise to a bolt arranged in the rear of the whiffletree, and this I do not claim; but

What I claim as my invention is—

1. The combination, with the tongue A, double whiffletree B, and pivot $d$, of the cast plates C and E, secured respectively to the under side of the whiffletree and the upper side of the tongue, and both provided with rearward extensions receiving the pivot $d$, the two plates forming a means of connecting the whiffletree to the pivot, and a bearing for the whiffletree, substantially as hereinbefore set forth.

2. The combination, with the double whiffletree B, tongue A, and pivot $d$, of the plate C, provided with finger $f$, and wear-plate E, provided with raised guide $g$, substantially as and for the purpose hereinbefore set forth.

ADRIAN C. LATTA.

Witnesses:
   S. M. NORTON,
   E. G. LATTA.